Aug. 23, 1960 — J. J. WEIER — 2,950,148
TRACTION DEVICES
Filed Nov. 17, 1958 — 3 Sheets-Sheet 1
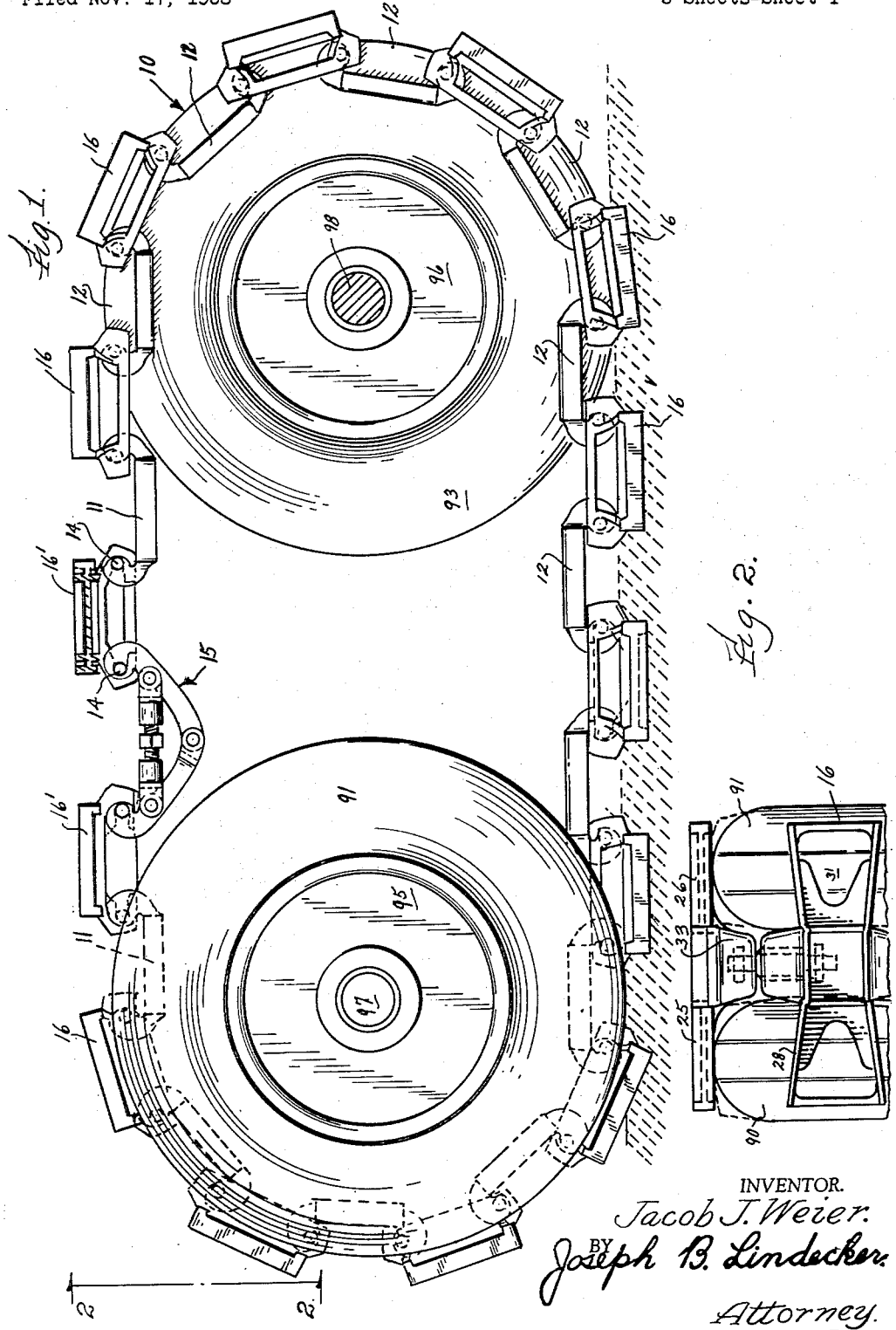
INVENTOR.
Jacob J. Weier.
BY Joseph B. Lindecker.
Attorney.

Aug. 23, 1960  J. J. WEIER  2,950,148
TRACTION DEVICES
Filed Nov. 17, 1958  3 Sheets-Sheet 2

INVENTOR.
Jacob J. Weier.
BY Joseph B. Lindecker.
Attorney.

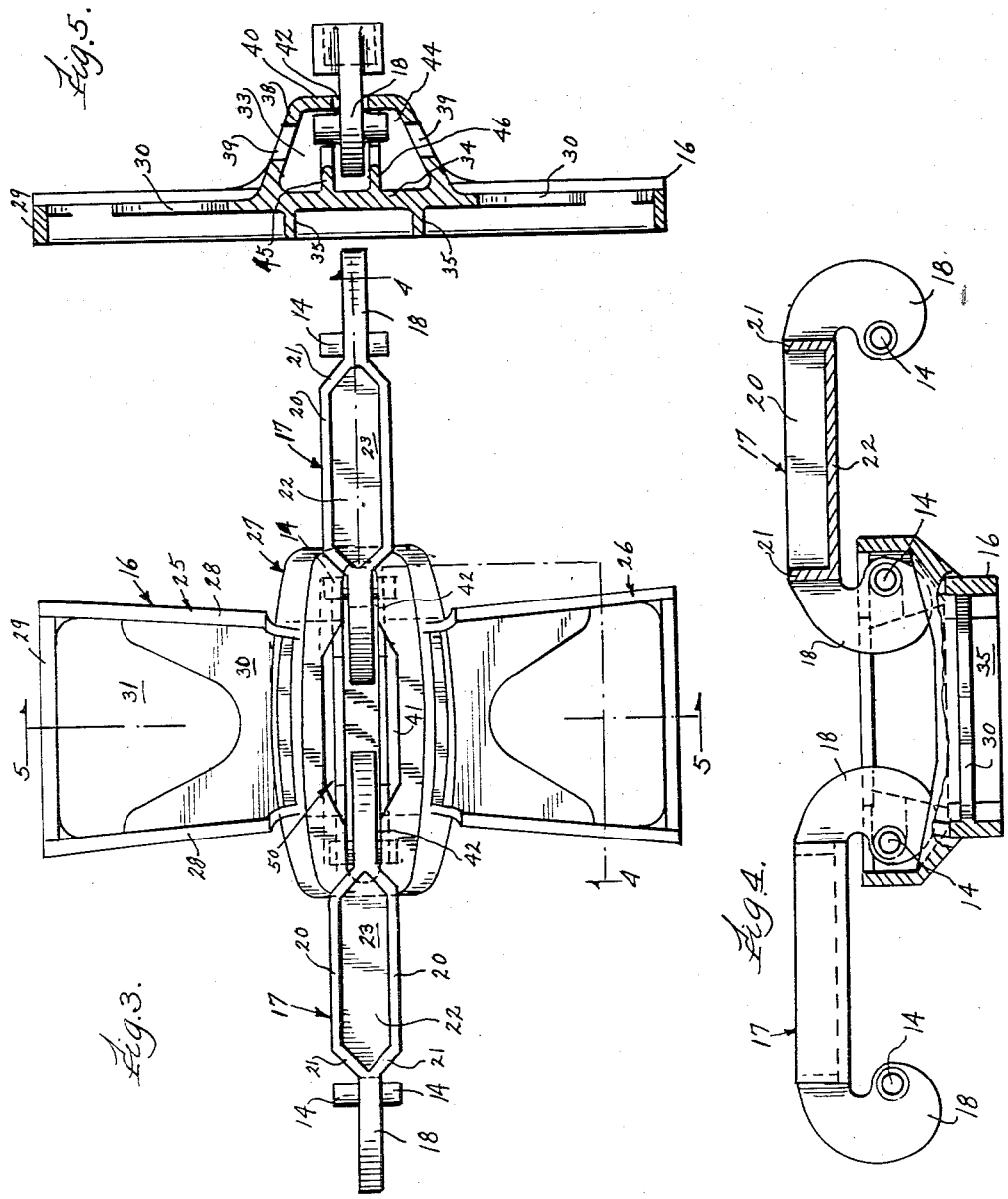

United States Patent Office 2,950,148
Patented Aug. 23, 1960

2,950,148

TRACTION DEVICES

Jacob J. Weier, 10611 S. Sawyer Ave., Chicago 43, Ill.

Filed Nov. 17, 1958, Ser. No. 774,464

15 Claims. (Cl. 305—13)

This invention relates to traction devices and more particularly to endless traction elements for motor trucks.

The invention is particularly adapted for application to the individual wheel units of vehicles where more than one tire is arranged side by side on a wheel, or wheels, mounted on a common axle, the traction device mounting means here being disposed between the vehicle wheels.

This invention relates to a new and improved endless traction chain with traction shoes, similar in function and design as described in applicant's issued Patent Number 2,859,067 issued November 4, 1958.

One object of this invention is to provide a traction belt or chain, forming an endless track, type traction device where hook shape bars or links are connected between the traction shoes which permit the bars or links to move up and/or down vertically, or laterally in the manner of the universal joint independently without displacement of the traction shoes from the tires, and a device wherein the harness mechanism is disposed between the tires, thus serving to keep mud from between the tires and one wherein the harness, when not in use, may be collapsed into a small space to facilitate convenient storage.

Another object of this invention is to provide a novel, durable and strong track-shoe with suitable opening therein to prevent the accumulation of mud, or the like, therein; affording a track-shoe superior to those now in use.

Still another object of this invention is to provide a traction chain, with track-shoes, which is relatively inexpensive and is well adapted to quantity production.

And still another object of this invention is to provide a chain with a plurality of track-shoes and intermediate links of identical structure and a novel connecting link which is constructed to vary in length and effect the desired tension of the chain.

A more specific object of this invention is to provide a traction device of the kind described which is mounted loosely on dual wheels with tires and quickly tightened to the desired extent to provide the desired tension, and is held in the tightened condition.

A further specific feature of this invention is to provide a strong and adjustable connecting link which is easily applied to the traction chain, and as easily attached, by a person; but it will not be detached by blows from exterior objects, or by shocks and jars incident to the travel of the wheels over rough roads and the like.

These and further objects of my invention will be set forth in the following specification, reference being had to the accompanying drawings, and the novel means by which said objects are effectuated will be definitely pointed out in the claims.

In the drawings:

Figure 1 is an elevation, partly in section, of two pairs of wheels arranged in tandem, each wheel having a tire thereon providing a dual tread, one of the wheels being removed in order to more clearly illustrate my improved traction device applied thereto and showing the adjustable connector link assembled to the two terminal traction shoes;

Figure 2 is a fragmentary end elevation of a pair of wheels and dual tires with this novel traction device, taken along the line 2—2 of Figure 1;

Figure 3 is a bottom view of one of the track-shoes of this invention having a pair of intermediate links assembled therewith;

Figure 4 is an elevation, partly in section of the track-shoe and links shown by Fig. 3, as arranged when in contact with the ground, and taken substantially on line 4—4 of Figure 3;

Figure 5 is a sectional view of the track shoe and links shown by Figures 3 and 4, and taken substantially on line 5—5 of Figure 4;

Figure 6:
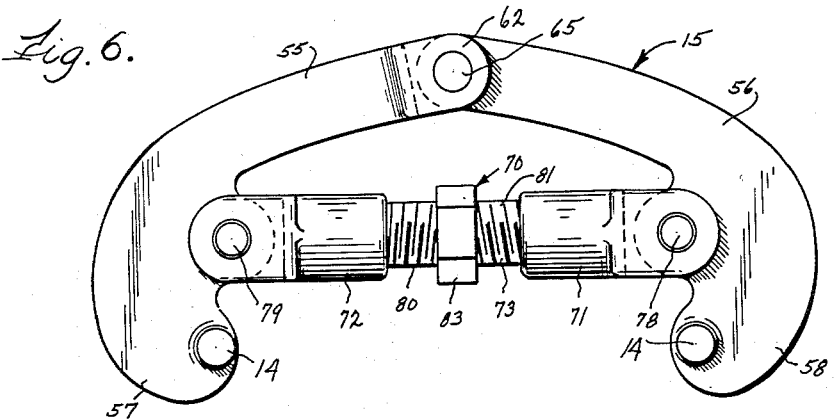
Figure 6 is an enlarged elevation of the adjustable connector link of this invention detached.

My traction device includes an endless chain 10 having a plurality of terminal links 11, intermediate links 12, terminal pins 14 carried by said terminal and intermediate links; an adjustable connector link 15, and perforated shoes 16 connected with and arranged between adjacent ends of said terminal and intermediate links.

The links are in the nature of C-shaped members with central body portions 17 whose ends terminate in the enlarged curved or rounded heads 18, said heads 18 provided with trunnions, or terminal pins 14 extending from the opposite sides thereof. The central body portion 17 is formed with vertical sides 20, tapered end walls 21, and a flat diamond-shaped base 22 effecting a hollow chamber 23.

Figure 7:
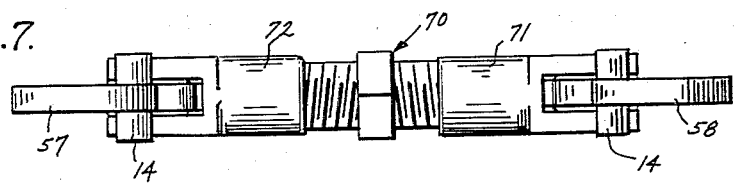
Figure 7 is an enlarged bottom view of the adjustable connector shown by Figures 1 and 6.
Figure 8:
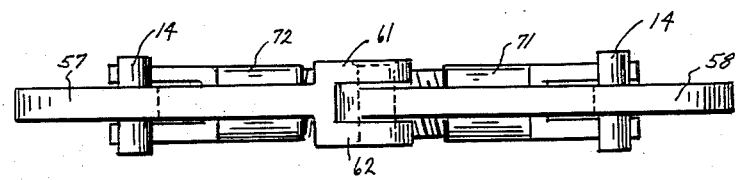
Figure 8 is an enlarged top plan view of the adjustable connector shown by Figures 6 and 7.
Figure 9:
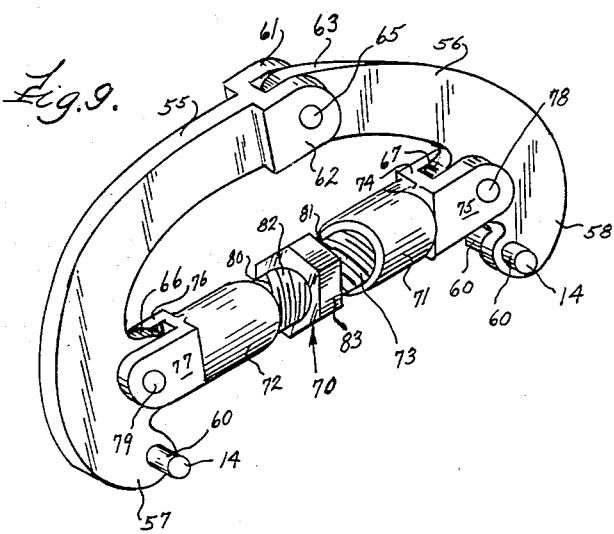
Figure 9 is an enlarged perspective view of the connector shown by Figures 1, 6, 7 and 8.

The shoes 16 are of substantially rectangular configuration and each formed with two identical end sections 25 and 26 integrally formed with a central body portion 27. Each end section comprises side walls, or grousers, or cleats 28, and end walls 29. Between the side walls 28 and the body portion 27, each end section 25 is provided with a flat gusset-plate 30 embodying a V-shaped recess therein effecting an aperture 31, or cone shaped opening, between the end walls 29 and said gusset-plate 30. The two apertures 31 in each shoe reduces the weight of the customary solid shoe and provides a sufficient opening for the tire tread used therein to extend substantially therethrough preventing the accumulation of mud and grit within the walls and gusset-plate of the shoes; the mud is actually ejected from the shoe while the chain is in motion. The central body portion 27, clearly shown by Figures 3, 4 and 5, is provided with a hollow chamber 33 with a flat base 34, said base 34 being in direct alignment and in the same plane as that occupied by said gusset-plates. Two ribs 35 are formed on said base 34 of each shoe adjacent said gusset-plates 30, whereby said gusset-plates and said base form a solid intermediate portion extending transversely across the major portion of each shoe for contacting the earth surface when in use. The lower portion of said central body portion 27 consists of two tapered side walls 38 extending downwardly and inwardly, each wall having an opening 39 therein to provide an exit for mud and the like which may accumulate within said hollow chamber 33. Said side walls 38 have integrally formed bottom surface portions extending inwardly forming a bottom wall 40 with a longitudinal opening 50 with its intermediate portion 41 of greater width than the length of said terminal pins 14 and of greater width than the end portions 42 thereof. The hollow chamber 33 is therefore provided with an apertured lower wall, the end sections of said hollow chamber providing a pocket 44 for removably securing said terminal pins of said links when assembled therein, as will be explained below. The end portions of the lower surface of said base 34 are provided with two downwardly extending ribs 45 and 46, said ribs being spaced parallel with each other and in alignment with the adjacent side walls; said ribs 45 and 46 having a space therebetween greater than the thickness of said rounded heads 18 of the links. Therefore, when the one end of a link is assembled with a shoe, the major portion of the head 18 with pin 14 is inserted into hollow chamber 33 through the central portion 41 of the opening 50 and then drawn longitudinally towards one end of the chamber 33 and into pocket 44 for pivoting and locking the pin 14 therein; said pin 14 being actually journalled therein and allowing the curved head portion 18 of the link to oscillate through the openings 42 as the chain passes around a tire. The intermediate links 12 and the shoes 16 are connected together to form the chain; an end portion of each adjacent link is assembled within the hollow chamber 33 of each shoe. The terminal links 11 have terminal pins 14 pivotally and removably secured within one end of a terminal shoe 16′. The terminal shoes 16′ are joined together by the adjustable connector link 15, shown by Figures 1, 6, 7, 8 and 9, to form an endless chain 10.

The adjustable connector 15 referred to above is formed of a plurality of parts, two cooperating jaws 55 and 56, each formed at their free ends with curved head portions 57 and 58 respectively, with pins 14 arranged and assembled therewith and passing therethrough, forming stub portions 60 extending outwardly from each side thereof. As shown clearly by Fig. 9, the jaw 55 is provided with a bifurcated shank portion having spaced parallel legs 61 and 62, and jaw 56 is provided with a solid shank portion with a substantially straight end portion 63 substantially of the same thickness as compared to the space between said legs 61 and 62, thus arranging for the assembly of the substantially straight end portion 63 thereof between said legs 61 and 62. The legs 61 and 62, and end portion 63 are apertured to receive a pivot pin 65 assembled transversely thereof, thus providing for swinging movement of the jaws 55 and 56 about this point. Adjacent the curved head portions 57 and 58 of the jaws 55 and 56 are provided ears 66 and 67 extending inwardly and towards each other when the jaws 55 and 56 are assembled together. Each ear is provided with a transverse perforation to receive a pin, later to be described. An adjusting bolt 70 is assembled between said ears 66 and 67, said bolt comprising end portions 71 and 72 with an intermediate screw portion 73. The end portions 71 and 72 are substantially tubular with bifurcated ends, said portions having legs 74, 75, 76 and 77 formed therewith. Legs 74 and 75 are pivotally mounted upon the ear 67 by a pivot pin 78, and the legs 76 and 77 are pivotally mounted upon the ear 66 by a pivot pin 79. The tubular end portions 71 and 72 are provided with threaded interior walls having right and left-hand threads, respectively, which walls are adapted to receive the complementally threaded end portions 80 and 81 of an adjusting screw 82 having a head 83 thereon by which it may be manually manipulated. It will be obvious that with this construction the head portions 57 and 58 are pivotally connected together through the adjusting bolt 70, the shank portions of the jaws 55 and 56 rocking upon the pin 65 extending through parts 61, 62 and 63. Thus the free ends of the jaws 55 and 56 with pins 14 can be drawn closer together or extended outwardly by manipulation of said head 83 on screw 82. The pivot pins 65, 78 and 79 connecting the jaws 55 and 56 and the bolt 70 together is a common plane and allowing free pivoting and movements of said parts as the head 83 of screw 82 is manipulated.

It will be apparent with this construction, the chain can be easily applied and tensioned upon the outer surface of the ties of dual wheels, or two tires arranged side by side on a single wheel, when said wheels are arranged in tandem as shown by Figures 1 and 2. By Figure 2, two tires 90 and 91 are arranged side by side upon a wheel 95. Figure 1 shows a tire 93 mounted upon a wheel 96, said wheel 96 having tire 93 thereon in direct alignment and in the same plane as tire 90 upon wheel 95. Wheels 95 and 96 are assembled upon axles 97 and 98 respectively.

The traction device therefore includes an endless chain 10 having links 11 and 12 connected with shoes 16, the terminal shoes connected together by the adjustable connector 15 to form an endless chain, the chain adjusted and/or tensioned by manipulation of head 83 on adjusting screw 82. The shoes 16 extend transversely of the tires, as shown by Figure 2, the end sections 25 and 26 of the shoes 16 extending across the top surface of the tires 90 and 91. The links 11, 12 and the lower body portion of the hollow chamber 33, are disposed between the tires as best shown by Fig. 2. The connector link 15 extends substantially below the center line of the endless chain 10 and is disposed to travel between the tires, such as tires 90 and 91.

In applying the chain 10 to tires with wheels in tandem, the links are connected to the shoes forming a chain. The chain is applied about the tires with the lower parts thereof disposed between the dual tires. After the chain has been applied, or the vehicle using the chain is moved upon the chain arranged on the ground, the terminal shoes are arranged close to each other and the adjusted connector link 15 is assembled therewith as described above; the head 83 of the adjusting screw is then manipulated to draw the terminal shoes toward each other, making an endless chain free from any dangerous amount of slack. If after the connector 15 is applied, the vehicle drive, slack should develop in the chain, the adjusting screw 82 can be manipulated, thereby removing the slack.

When the connector 15 is applied properly, exterior pressure on the chain 10 causes the terminal pins to be held more securely within the connecting chain parts.

My chain is absolutely proof against being unfastened by striking any exterior objects because the connector link 15 and other operative parts are entirely protected by the resilient tires juxtaposed thereto, and the strain on the shoes is absorbed by the gusset-plates formed therewith.

When it is desired to disengage the chain from the wheels and tires, the connector link is manipulated to allow the jaws to spread farther apart, allowing the pins therewith to be removed from the terminal shoes, and then the chain can be quickly released.

A considerable advantage of the novel chain with jaw type adjusting connector embodied therewith as illustrated, is that it folds into a stowing position occupying little space.

It will be understood that modifications and variations may be effected without departing from the scope of the novel concepts of the present invention.

What I claim is:

1. In a traction device for vehicle wheels arranged in tandem, the combination of wheels arranged in tandem having dual tires, a chain having a plurality of terminal and intermediate shoes, and a plurality of terminal and intermediate links for arrangement between the dual tires on the wheels, terminal pins carried by the end portions of said terminal and intermediate links, all of said terminal and intermediate shoes being substantially retangular in shape with a hollow central body portion formed with opposed slotted portions and with end sections integrally secured thereto, said central body portion of said terminal and intermediate shoes receiving in their slotted portions the pins of the adjacent ends of said terminal and intermediate links to secure said terminal and intermediate shoes and said terminal and intermediate links in operative relation, an adjustable connector link between the terminal shoes having curved head portions, terminal pins carried by the curved head portions of said adjustable connector link, said terminal shoes receiving in their slotted portions the pins of said adjustable connector link, each of said intermediate shoes being located between a pair of said intermediate links, each of said terminal shoes being located between a terminal link and said connector link, gusset-plates carried by said terminal and intermediate shoes and disposed transversely thereof for arrangement upon the dual tires of said wheel, and manually operable means for manipulating said adjustable connector link in adjusted position.

2. The tandem device as claimed in claim 1 in which said terminal and intermediate shoes and said gusset-plates therewith embody an aperture and the tread of the tires on the wheels adapted to project through the aperture whereby mud and the like is prevented from accumulation.

3. The tractor device as claimed in claim 1, in which the terminal and intermediate links are C-shaped and each embody a central hollow body chamber.

4. The traction device as claimed in claim 3 in which the adjustable connector link is formed with enlarged curved head portions at each end thereof with terminal pins extending transversely therethrough.

5. The traction device as claimed in claim 1 in which the adjustable connector link is formed of a plurality of movable parts with pivot pins arranged therebetween.

6. The traction device as claimed in claim 1 in which the adjustable connector link consists of two movable jaws having one end of each pivoted together, said terminal pins arranged in the opposite ends of the jaws, the intermediate portions of said jaws having ears, a pivot pin arranged in each of said ears, and said manually operable means consisting of an adjustable bolt pivotally assembled between said jaws and connected with said pivot pins.

7. The traction device as claimed in claim 1 in which the adjustable connector link consists of two movable jaws having one end of each pivoted together, ears integrally formed with said jaws adjacent the free ends thereof and assembled to extend toward each other, an adjustable bolt pivotally assembled between said ears, said bolt comprising tubular end portions with threaded interior walls having right and left-handed threads, said walls adapted to receive the complementally threaded end portions of an adjusting screw assembled therebetween, said screw embodying means whereby it can be manually manipulated.

8. The traction device as claimed in claim 7 in which the jaws are of arcuate shape with their concave portions arranged in juxtaposition.

9. In a traction device for vehicle wheels arranged in tandem, the combination of wheels arranged in tandem having dual tires, an endless chain having a plurality of terminal and intermediate links with rounded head end portions, a plurality of terminal and intermediate shoes, and an adjustable connector link with curved head end portion, said intermediate links to be arranged between said intermediate shoes, said terminal links to be arranged between the terminal shoes and an adjacent intermediate shoe, said adjustable connector link formed of a plurality of parts to be arranged between the terminal shoes, said terminal and intermediate shoes and said terminal and intermediate links being arranged to have outwardly extending portions thereof to function between the dual tires on the wheels, terminal pins carried by the rounded head end portions of each of said terminal and intermediate links, terminal pins carried by the curved head end portions of said connector link, said terminal and intermediate shoes formed with a hollow central body portion and with a section integrally attached on the opposite sides thereof, each of said hollow central body portions being formed with opposed slotted wall portions and arranged between said links, said hollow central body portions receiving in their slotted portions the pins of the adjacent ends of said links to secure said links in operative relation, cleats carried by said terminal and intermediate shoe sections and disposed longitudinally of the shoe for arrangement transversely upon the dual tires of said wheels, and manually operable means embodied with said connector link for manipulating said parts of said connector link to various desired positions.

10. The traction device as claimed by claim 9 in which said means for manipulating said connector link consists of a bolt having a screw with right and left-handed threaded end portions adapted to function in tubular end portions of the bolt provided with complementally threaded interior walls, said screw having a nut intermediate its ends by which it can be manipulated.

11. The traction device as claimed by claim 9 in which said adjustable connector link comprises a pair of arcuate shaped jaws with concave portions adjacent each other in a common plane, one end of each of said jaws perforated and pivoted together, said terminal pin carried on the opposite curved head end portions thereof, ears formed on each jaw adjacent the curved head portions thereof, said manually operable means consisting of a bolt arranged between said ears, said bolt consisting of tubular end portions with a screw interposed therebetween, said tubular portions provided with interior walls having right and left-handed threads therewith, said walls adapted to receive the complementally threaded end portions of said screw.

12. The traction device as claimed by claim 11 wherein said screw is provided with a nut intermediate its ends by which it can be manipulated.

13. In a traction device for vehicle wheels arranged in tandem, the combination of wheels arranged in tandem having dual tires thereon, an endless chain composed of at least five (5) intermediate links and two ( 2) terminal links, six (6) intermediate shoes and two (2) terminal shoes and a connector link for arrangement between the dual tires on the wheels in tandem, said connector link being adjustable and arranged between the terminal shoes, said connector link composed of a pair of arcuate shaped jaws with curved head end portions, said jaws pivoted together at the opposite ends thereof, ears formed on said jaws adjacent said curved head end portions, terminal pins carried by said ears, and an adjustable bolt interposed between said ears.

14. The traction device as claimed by claim 13 wherein said bolt is provided with tubular end members and a screw therebetween, said tubular end members provided with internal walls having right and left threads therewith, said walls adapted to receive the complementally threaded end portions of said screw.

15. A traction device for vehicle wheels, the combination of a wheel having dual tires thereon, an endless chain having a plurality of terminal and intermediate links, a plurality of terminal and intermediate shoes, and an adjustable connector link, said connector link comprising two arcuate shaped jaws with curved head end portions, said jaws having the opposite ends thereof pivoted to each other, terminal pins carried by the curved head end portions of said jaws, said terminal shoes having means to receive said terminal pins of said jaws, ears formed upon each jaw intermediate the ends thereof and adjacent the curved head end portions, and a dual ended adjustable bolt having its ends pivotally connected with said ears whereby said jaws may be adjusted relative thereto.

References Cited in the file of this patent

UNITED STATES PATENTS

| | | |
|---|---|---|
| 1,423,202 | Fellows | July 18, 1922 |
| 1,460,657 | Kintz | July 3, 1923 |
| 2,171,547 | Galanot | Sept. 5, 1939 |
| 2,432,329 | Marthinsen | Dec. 9, 1947 |
| 2,859,067 | Weier | Nov. 4, 1958 |